US010428642B2

(12) United States Patent
Carpenter et al.

(10) Patent No.: US 10,428,642 B2
(45) Date of Patent: Oct. 1, 2019

(54) TRANSPOSITION OF LOGS ONTO HORIZONTAL WELLS

(71) Applicant: Halliburton Energy Services, Inc., Houston, TX (US)

(72) Inventors: Glenn F. Carpenter, Houston, TX (US); Daniel Robert Buller, Shreveport, LA (US); Travis Lee Jeffers, Lantana, TX (US); Charles Stringer, Houston, TX (US); John Andrew Quirein, Georgetown, TX (US); Yi Zhou, Sugar Land, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/505,821

(22) PCT Filed: Oct. 1, 2014

(86) PCT No.: PCT/US2014/058627
§ 371 (c)(1),
(2) Date: Feb. 22, 2017

(87) PCT Pub. No.: WO2016/053330
PCT Pub. Date: Apr. 7, 2016

(65) Prior Publication Data
US 2017/0306750 A1    Oct. 26, 2017

(51) Int. Cl.
*E21B 47/09* (2012.01)
*G01V 5/12* (2006.01)
(Continued)

(52) U.S. Cl.
CPC ............... *E21B 47/09* (2013.01); *G01V 3/00* (2013.01); *G01V 5/045* (2013.01); *G01V 5/12* (2013.01); *G01V 11/002* (2013.01); *E21B 47/00* (2013.01)

(58) Field of Classification Search
None
See application file for complete search history.

(56) References Cited

U.S. PATENT DOCUMENTS 4,981,037 A * 1/1991 Holbrook ................ E21B 21/08
166/250.07
6,718,266 B1 * 4/2004 Sinha ........................ G01V 1/48
367/75
(Continued)

FOREIGN PATENT DOCUMENTS

EP           0718641 B1     8/2003
WO    WO 2014/025354 A1    2/2014

OTHER PUBLICATIONS

Jenny-Mabel Carvajal Jiménez, Geomechanical Wellbore Stability Modeling of Exploratory Wells—Study Case At Middle Magdalena Basin, Oct. 11, 2007, p. 85-102.*
(Continued)

*Primary Examiner* — Tung S Lau

(57) ABSTRACT

In some embodiments, a method for transposition of logs onto a horizontal well path may include collecting vertical situational data from a plurality of depths of a vertical well in a geological formation and collecting horizontal situational data from a plurality of locations along the horizontal well path in the geological formation. The method further includes collecting geological data associated with the plurality of depths of the vertical well and generating pseudo-logs for the horizontal well path based on the plurality of depths and the associated geological data for the plurality of depths.

18 Claims, 5 Drawing Sheets

(51) Int. Cl.
*G01V 3/00* (2006.01)
*G01V 5/04* (2006.01)
*G01V 11/00* (2006.01)
*E21B 47/00* (2012.01)

(56) References Cited

U.S. PATENT DOCUMENTS

| | | | | |
|---|---|---|---|---|
| 9,262,713 | B2* | 2/2016 | Shelley | E21B 43/26 |
| 2007/0064529 | A1* | 3/2007 | Robinson | G01V 1/40 |
| | | | | 367/31 |
| 2008/0319675 | A1* | 12/2008 | Sayers | G01V 1/50 |
| | | | | 702/11 |
| 2010/0032156 | A1* | 2/2010 | Petty | E21B 43/26 |
| | | | | 166/252.1 |
| 2011/0022320 | A1 | 1/2011 | Abousleiman et al. | |
| 2011/0182144 | A1* | 7/2011 | Gray | G01V 1/30 |
| | | | | 367/75 |
| 2011/0292766 | A1* | 12/2011 | Bachrach | G01V 1/282 |
| | | | | 367/73 |
| 2012/0185225 | A1 | 7/2012 | Onda et al. | |
| 2012/0257476 | A1* | 10/2012 | Muhl | G01V 1/325 |
| | | | | 367/38 |
| 2013/0270011 | A1 | 10/2013 | Akkurt et al. | |
| 2013/0332131 | A1 | 12/2013 | Russell et al. | |
| 2014/0222345 | A1 | 8/2014 | Langenwalter et al. | |
| 2014/0278318 | A1* | 9/2014 | Kauerauf | G01V 99/005 |
| | | | | 703/10 |
| 2015/0284810 | A1* | 10/2015 | Knight | E21B 43/16 |
| | | | | 506/2 |
| 2015/0284811 | A1* | 10/2015 | Knight | E21B 47/1015 |
| | | | | 506/2 |

OTHER PUBLICATIONS

International Search Report and The Written Opinion of the International Search Authority, or the Declaration, dated Jun. 30, 2015, PCT/US2014/058627, 14 pages, ISA/KR.

* cited by examiner

TRANSPOSITION OF LOGS ONTO HORIZONTAL WELLS

PRIORITY

The present application is a U.S. National Stage patent application of International Patent Application No. PCT/US2014/058627, filed on Oct. 1, 2014, the benefit of which is claimed and the disclosure of which is incorporated herein by reference in its entirety.

BACKGROUND

Knowledge of the structure and properties of geological formations may reduce the cost of drilling wells for oil and gas exploration in those formations. Measurements made in a borehole (down hole measurements) may provide this knowledge, identifying the composition, structure, properties, and distribution of material that surrounds a measurement device down hole.

Logging tools may provide measurement information directly related to geomechanical properties. Logging is the process of making measurements via sensors located downhole. Although logging is commonly performed in vertical offset wells, it may be difficult to perform in a horizontal well.

Horizontal drilling and multiple fracture treatments create fracture surface area in shale formations and promise increased production in previously inefficient wells and/or formations. At the same time, making these completions effectively has presented a significant challenge to the industry. If the focus is on reduced costs, the operator may depend on a gamma ray log as the only well log measurement acquired in a horizontal well. In these cases, wellbore specific data that are normally available for vertical wells are not available for horizontal wells. This missing data could be used to estimate wellbore characteristics such as storage, saturations, pressures, rock properties, organic carbon content, and/or mineralogy.

DETAILED DESCRIPTION

To address some of the challenges described above, as well as others, systems and methods for performing transposition of logs onto horizontal wells are subsequently described. The described embodiments may provide more consistent treating pressures, more consistent proppant placement, more consistent perforation cluster breakdown and fracture propagation, and more consistent perforation cluster contribution to production.

The subsequently described embodiments use data from an offset well in conjunction with a geological model to create pseudo logs. A pseudo log may be defined as a geometric projection of an offset well log along a well path through a geological model. If the offset well data are projected along the planned well path parallel to the geology, a predicted or pseudo log may be created.

In contrast, current approaches generally ignore or only qualitatively use information from vertical offset wells and, even when appropriate data are available from a horizontal well, may rely exclusively on experience to define the stage and perforation clusters. Fracture stages may be placed along a wellbore using only a gamma ray and/or mud log and traditional cuttings data. These current approaches suggest fracturing stages that are in reality more ductile than is indicated by the gamma ray data.

Figure 1:
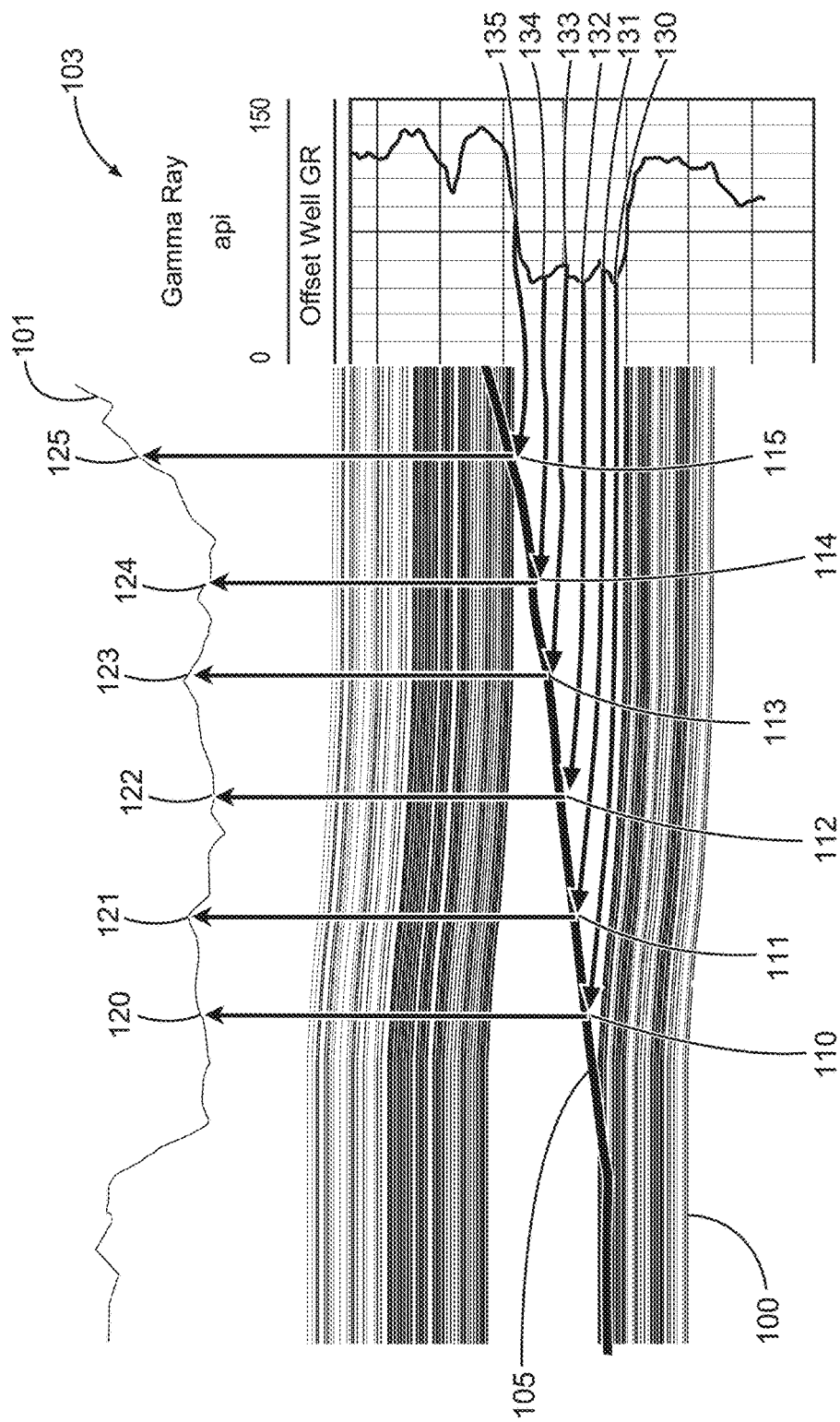
FIG. 1 is a diagram showing a geometric projection along a horizontal well path through a geological model.

FIG. 1 is a diagram showing a geometric projection along a horizontal well path through a geological formation 100. The geological formation 100 may be represented by a geological model. A geological model may be defined as a computerized representation of portions of the Earth's crust based on geophysical and geological observations made on and below the Earth's surface. A geological model may be the numerical equivalent of a three-dimensional geological map complemented by a description of physical quantities in the domain of interest.

A substantially horizontal well 105 is drilled through the geological formation 100. While this well 105 may be referred to as horizontal (e.g., substantially parallel with the surface), it may be drilled at some angle other than horizontal. Other embodiments may have portions of the well 105 that are parallel with the surface while other portions are drilled at an angle relative to the surface.

Figure 4:
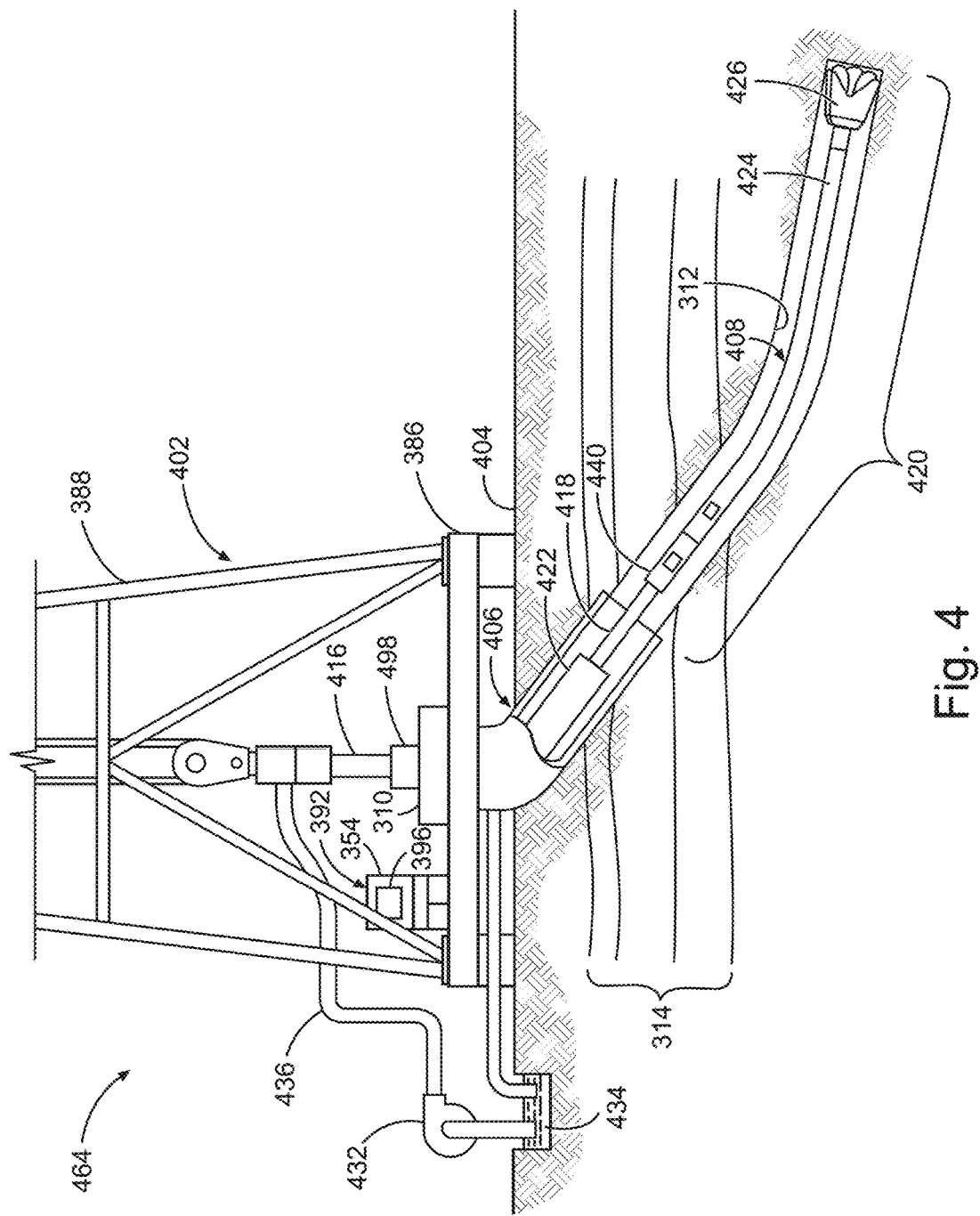
FIG. 4 is a diagram showing an embodiment of a drilling rig system in accordance with various embodiments.

As the horizontal well 105 is being drilled, horizontal situational data are collected. The horizontal situational data may be gamma ray data of a surrounding formation from a gamma ray transceiver in the drill string, a resistivity log of the surrounding formation, or cuttings from the drill process of the surrounding formation. If the gamma ray transceiver is used, a horizontal gamma ray plot 101 may be generated comprising data 120-125 that represent and determine various locations 110-115 along the horizontal well. The horizontal situational data may be collected from a tool that may be part of the drill string, as illustrated in the system of FIG. 4 and discussed subsequently. The collection of this data may be accomplished during a logging while drilling (LWD)/measurement while drilling (MWD) operation.

A vertical offset well is used to collect vertical situational data. For example, a gamma ray plot 103, as illustrated in FIG. 1, from a gamma ray transceiver in a wireline tool may be used, a resistivity log, or cuttings from various depths may be collected that represent each particular depth.

Figure 2:
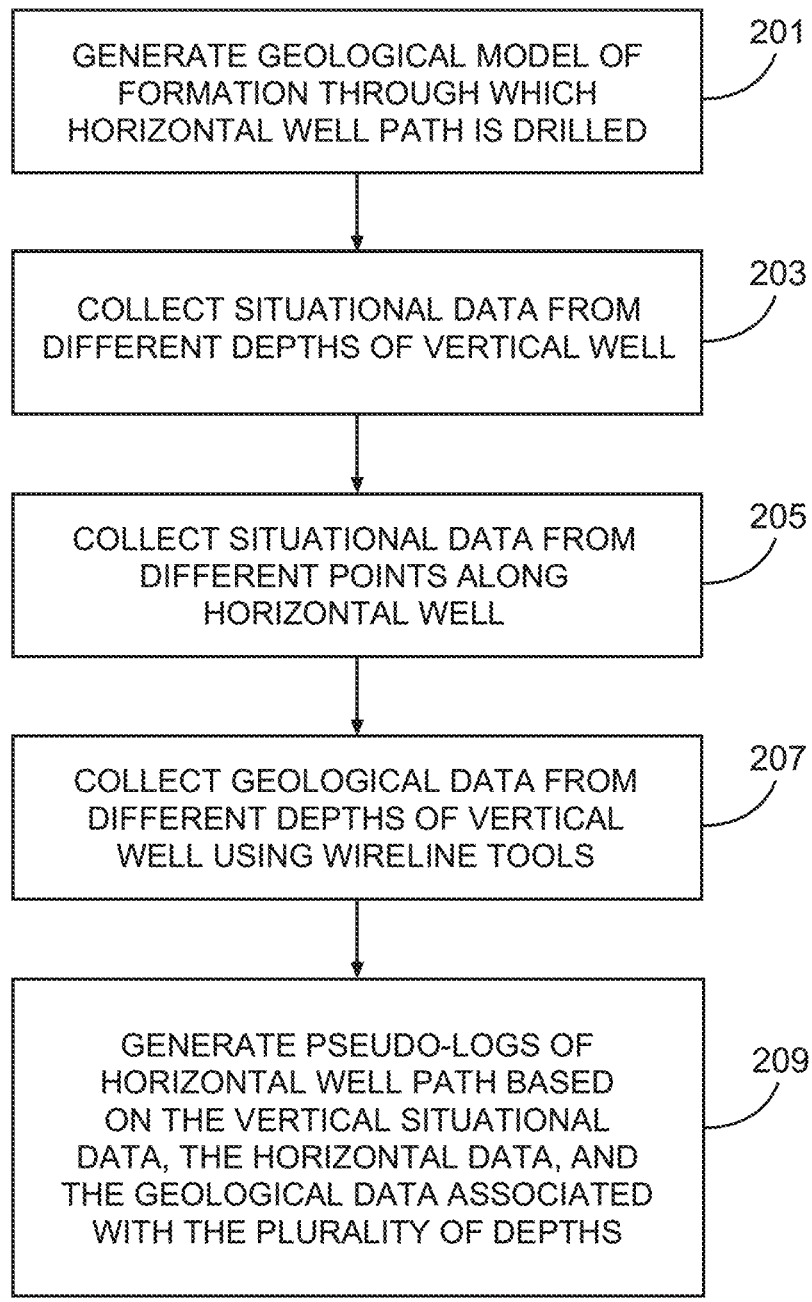
FIG. 2 is a flowchart showing an embodiment of a method for transposition of logs onto horizontal wells in accordance with the embodiment of FIG. 1.

FIG. 2 is a flowchart showing an embodiment of a method for transposition of logs onto horizontal wells. FIG. 2 is viewed in combination with the diagram of FIG. 1 in describing embodiments of the method for transposition of logs onto horizontal wells.

Referring to the flowchart of FIG. 2, in block 201, a geological model is generated for the geological formation through which the horizontal well path is drilled. As described previously, this model describes the geophysical and geological attributes of the portion of the Earth's crust that the horizontal well is drilled or will be drilled. Referring to FIG. 1, the geological model may be represented by the different illustrated layers of the formation 100.

In block 203, situational data are collected from different depths of a vertical well (e.g., a neighboring offset well). The vertical well may be located relatively close to the horizontal well in order for the geological data from the offset well to closely correlate to the horizontal well. The situational data may be defined as some type of indication representative of a particular location in the well. For the vertical well, the situational data may be representative of a particular depth. For the horizontal well, the situational data may be representative of a particular horizontal location. As described previously, the situational data may be acquired through a gamma ray response, resistivity log, drill cuttings analyzed for elemental composition, ratios developed from the elemental composition and/or pyrolysis, or some other indication of a particular depth or location.

One example of situational data is illustrated in the gamma ray plot 103 of FIG. 1. Each point on the plot 103 corresponds to a different depth of the vertical well.

In block 205, situational data are collected from different horizontal points along the horizontal well. Examples of the horizontal situational data 120-125 are illustrated in the gamma ray plot 101 of FIG. 1. These data 120-125 are representative of certain locations 110-115 along the horizontal well.

FIG. 1 illustrates six locations 110-115 along the horizontal well that are represented by both horizontal situational data 120-125 and vertical situational data 130-135. This is for purposes of illustration only as the method for transposition of logs may use any number of situational data points along the vertical/horizontal gamma ray plot, resistivity log, or cuttings.

Figure 3:
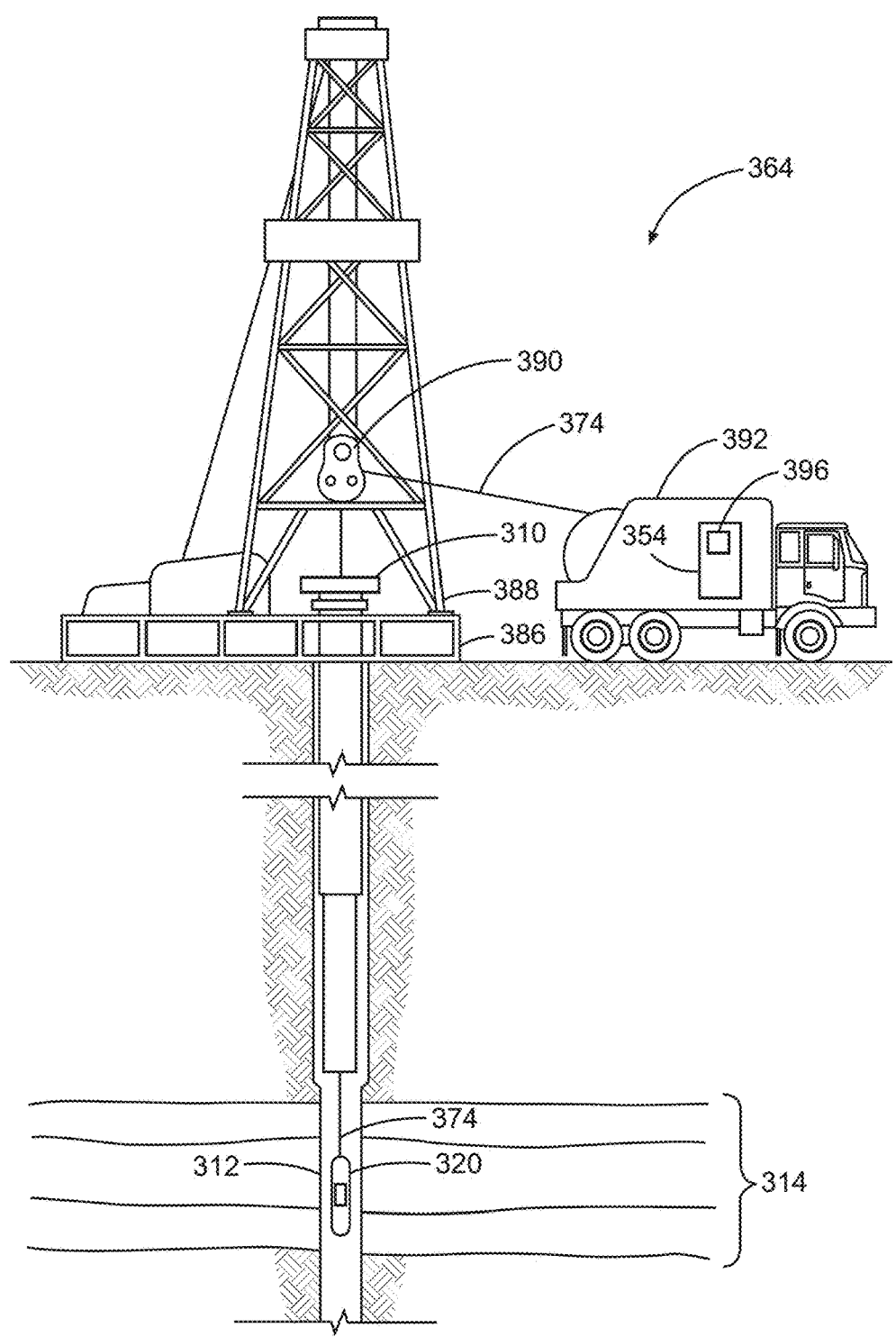
FIG. 3 is a diagram showing an embodiment of a wireline system in accordance with various embodiments.

In block 207, geological data are collected from different associated depths of the vertical well. This may be accomplished using a downhole tool in a wireline system, as illustrated in FIG. 3 and discussed subsequently. Other embodiments may use other methods for collecting this data.

In block 209, pseudo-logs are generated along the horizontal well path 105 based on the vertical situational data, the horizontal situational data, and the geological data associated with the plurality of depths. This may be accomplished by mapping the collected geological data to each particular location of a plurality of locations 110-115 along the horizontal well path 105 using the horizontal situational data 120-125 that is associated with the vertical situational data 130-135. For example, geological data collected at a first point 130 along the vertical well may be associated with particular vertical situational data point 130 for that location. An associated horizontal situational data point 120 is determined by finding the situational data, within the horizontal situational data 120-125, that matches the vertical situational data point 130. The geological data may then be assigned to the particular horizontal location point 110 associated with both the vertical and horizontal situational data points 130, 120.

Once the pseudo-logs have been generated, they may be used in many different applications. In an embodiment, pseudo logs may be used to assist in geosteering during a drilling operation. As new real-time data is acquired from the MWD/LWD operation or drill cuttings analysis, correlations between the vertical and horizontal logs may be made and the projected geology changes. In this case, the match between the real time LWD logs and pseudo logs may imply that the projected geological model is correct. The more curves that match, the higher the confidence in the pseudo logs and projected geological model.

The above-described embodiments may use geological data, such as that obtained from an advanced formation evaluation in the offset well that is not used in the correlations but projected from the vertical well along the horizontal well. Such projected data may be used to engineer the stage and perforation selections. In this embodiment, it may be assumed that there is little stratigraphic change from the offset well and along the length of the horizontal well.

The following methodology may be used to engineer a completion process. In a completion process, stages are defined and, within each stage, locations to perforate are selected. Stages need not be contiguous (e.g., gaps may exist between stages). After the perforations are shot for a stage, the well may be fractured.

The method below may be applied to pseudo logs, log predictions obtained from a neural network, or logs obtained in the horizontal well. Logs may include LWD data, mud log, wellbore gas analysis readings, elemental and mineralogical data obtained from cuttings, and/or pyrolysis data derived from cuttings. The engineered completion process relies upon two observations: 1) production results that have been observed to be lithology (facies) dependent and 2) certain variables that have been observed at a time to correlate with reservoir quality and production. As is known in the art, facies is a body of rock with specified characteristics.

Certain facies are preferred and certain facies may be avoided. For example, stages and perforations may not be attempted when in such facies. While there are many procedures for obtaining facies, procedures that order the facies operate best in the above-described embodiments.

In general, the delineation of facies from mineralogy is not limited to three mineralogies. Total clay, quartz, and calcite may be obtained from pseudo logs, neural network predictions, or of actual data obtained in the horizontal from cuttings or interpretation of pulsed neutron logging data. One possible scenario would be to delete long contiguous sections of undesirable facies from the completion process.

One or more Production Indices may also be computed from pseudo logs, log predictions obtained from a neural network, logs obtained in the horizontal well and facies. The following equation 1 is an example of a simple production index, $PI_c$, where the subscript c denotes a piecewise continuous function (potential discontinuities at facies boundaries when the facies have been ordered using integers) and c, f b, and p are constants and, in general, may vary between unconventional plays. The number of variables summed may vary for each unconventional play.

$$PI_c = c \times (f \times \text{Facies} + b \times \text{Brittleness} + p \times \text{EffectivePorosity}) \quad (1)$$

Another type of production index is of the discrete type, denoted as $PI_d$, and illustrated in Equation 2. The following equation measures production but is not limited to these may be used: Vclay, effective porosity, volume gas, volume kerogen, volumes minerals 1, 2, 3, . . . , N, brittleness, fracture closure pressure, fracture width, Poisson's ratio, Young's modulus, Facies, Mud log total gas.

Consider the $i^{th}$ indicator $X_1$ that satisfies the relation:

$$\delta_i = 0$$

if $(l_i \le X_i \le u_i)$ then $(\delta_i = 1)$ $$PI_d = \Sigma w_i \delta_i \quad (2)$$

The lower $l_i$ and upper $u_i$ bounds, and weights $w_i$ are all input parameters. The output curves for each indicator are the individual $w_i \delta_i$ and also output is the discrete production index $PI_d$. Various indicators, such as fracture closure pressure, brittleness, distance to a bed boundary, and fracture density from image logs, can be used for a fracability index.

Another type of production index involves estimating, at particular intervals along the horizontal well path, the simulated reservoir volume (integrating fracture length, width and height). Multiple month production may also be estimated using a calibrated neural network.

It can be seen that different indicators may be used to compute different production indices. For example, one set of variables may be used to compute a first production index, and a second set of variables may be used to compute a second production index. The two or more production indices may be used by an algorithm to select stages to be fractured and locations within each stage to be perforated.

Other ways to define facies, using clustering of the pseudo log data, may be combined with an appropriate production index to order the facies. As an example, the closure pressure gradient, volume kerogen, effective porosity, Poisson's ratio, brittleness, clay volume may be used to define a discrete production index $PI_d$ referred to as "Productivity". A clustering program, typically referred to as a Self-Organizing Map, may be employed to map the data from the n-dimensional log space to a two dimensional grid while preserving the topology (samples close in the n-dimensional space are also close in the two dimensional space.

Figure 5:
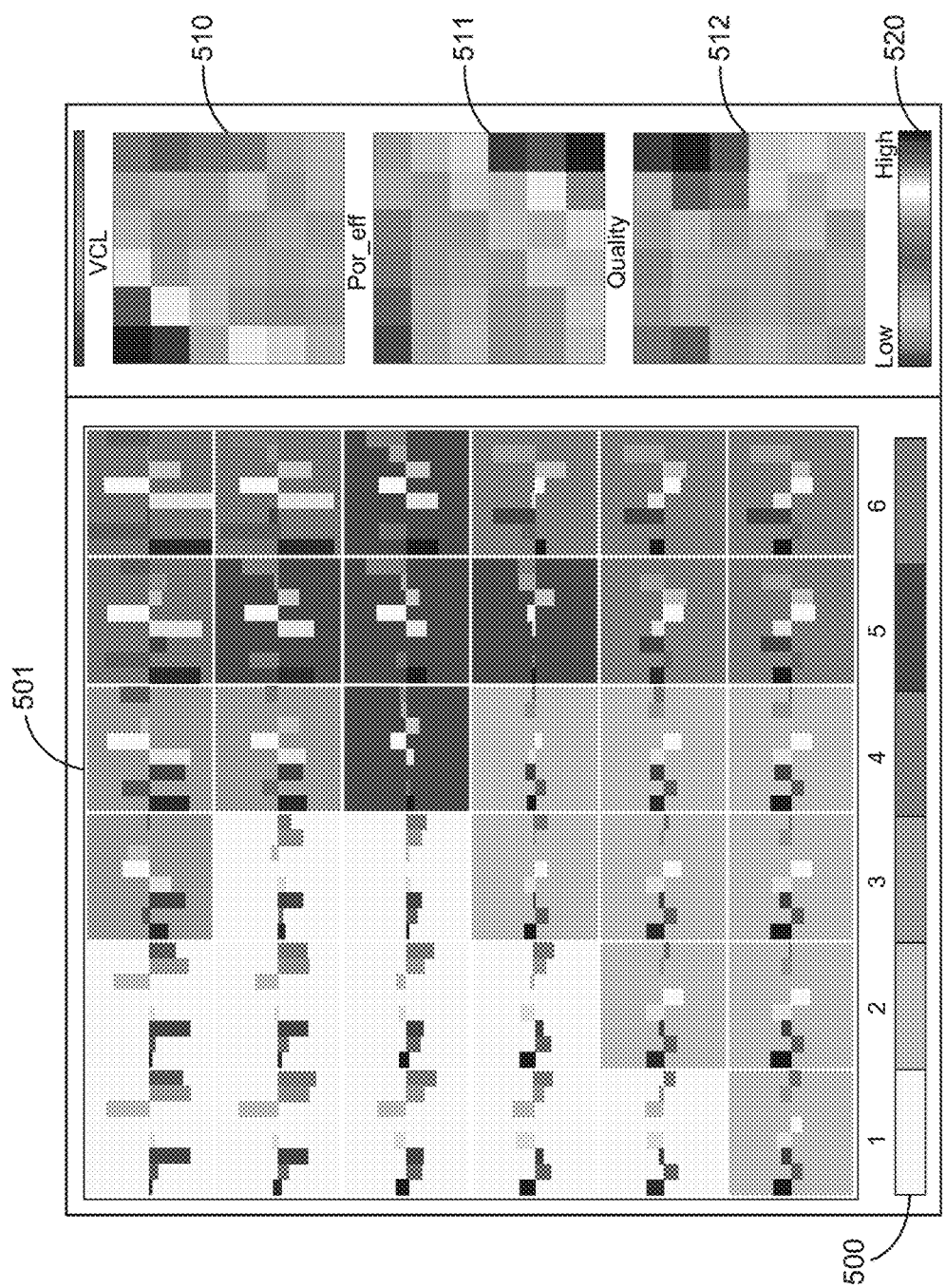
FIG. 5 is a plot showing a clustering of nodes with ordering of the clusters according to productivity index.

FIG. 5 is a plot showing a clustering of nodes with ordering of the clusters according to productivity index. The figure shows a productivity index key 500 at the bottom and a grid of nodes 501.

The data has been clustered by applying a Self Organizing Map to the input curves closure pressure gradient, volume kerogen, effective porosity, Poisson's ratio, brittleness, clay volume and productivity index. Each square in the six-by-six grid 501 represents a cluster with the property that adjacent squares have similar geomechanical properties. The vertical bars in each square represent the average values of the inputs. These 36 squares of the grid 501 are again clustered into six facies using a K-means clustering program and the facies are ordered with respect to the productivity index so that the lowest numbers, as represented by the productivity key 500, represent the facies with the lowest quality and facies 6 has the highest quality. FIG. 5 further shows the average value of the inputs clay volume 510, effective porosity 511, and productivity index 512 for each of the clusters of the Self Organizing Map is displayed according to the shading of key 520. The lower numbered facies may be ignored as completion candidates.

FIG. 3 is a diagram showing an embodiment of a wireline system in accordance with various embodiments and FIG. 4 is a diagram showing an embodiment of a drilling rig system in accordance with various embodiments.

The embodiments illustrated in FIGS. 3 and 4 are for purposes of illustration only and do not limit the method for transposition of logs onto horizontal wells. For example, coiled tubing or other methods may be used to obtain the vertical situational data. Similarly, the drilling rig system may be used offshore such that the geological formation is underwater.

Thus, the systems 364, 364 may include portions of a wireline logging tool body 320, as part of a wireline logging operation, or of a drill string tool 424, as part of a down hole drilling operation. The wireline logging tool of FIG. 3 may be used to collect geological data from different associated depths of the offset well as described previously. The horizontal situational data may be collected from the drill string tool 424.

FIG. 3 shows a well during wireline logging operations. A drilling platform 386 is equipped with a derrick 388 that supports a hoist 390. Drilling of oil and gas wells is commonly carried out using a string of drill pipes connected together so as to form a drilling string that is lowered through a rotary table 310 into a wellbore or borehole 312. Here it is assumed that the drilling string has been temporarily removed from the borehole 312 to allow a wireline logging tool body 320, such as a probe or sonde, to be lowered by wireline or logging cable 374 into the borehole 312. Typically, the wireline logging tool body 320 is lowered to the bottom of the region of interest and subsequently pulled upward at a substantially constant speed.

During the upward trip, at a series of depths, the instruments (e.g., transducers and receivers) included in the tool body 320 may be used to perform measurements on the subsurface geological formations 314 adjacent the borehole 312 (and the tool body 320). The received data, that may include acoustic data, may be communicated to a surface logging facility 392 for storage, processing, and/or analysis as described previously. The logging facility 392 may be provided with electronic equipment for various types of signal processing. Similar formation evaluation data may be gathered and analyzed during drilling operations (e.g., during LWD operations, and by extension, sampling while drilling).

In some embodiments, the tool body 320 comprises an acoustic tool for obtaining and analyzing acoustic measurements from a subterranean geological formation through a wellbore. The tool is suspended in the wellbore by a wireline cable 374 that connects the tool to a surface control unit (e.g., comprising a workstation 354). The tool may be deployed in the wellbore on coiled tubing, jointed drill pipe, hard wired drill pipe, or any other suitable deployment technique.

Turning now to FIG. 4, it can be seen how a system 464 may also form a portion of a drilling rig 402 located at the surface 404 of a well 406. The drilling rig 402 may provide support for a drill string 408. The drill string 408 may operate to penetrate a rotary table 310 for drilling a borehole 312 through subsurface formations 314. The drill string 408 may include a top drive 416, drill pipe 418, and a bottom hole assembly 420, perhaps located at the lower portion of the drill pipe 418.

The bottom hole assembly 420 may include drill collars 422, a down hole tool 424, and a drill bit 426. The drill bit 426 may operate to create a borehole 312 by penetrating the surface 404 and subsurface formations 314. The down hole tool 424 may comprise any of a number of different types of tools including MWD tools, LWD tools, and others. The down hole tool 424 may include a gamma ray transceiver configured to transmit and receive gamma ray data as discussed previously.

During drilling operations, the drill string 408 (perhaps including the Kelly 416, the drill pipe 418, and the bottom hole assembly 420) may be rotated by the rotary table 310. In addition to, or alternatively, the bottom hole assembly 420 may also be rotated by a motor (e.g., a mud motor) that is located down hole. The drill collars 422 may be used to add weight to the drill bit 426. The drill collars 422 may also operate to stiffen the bottom hole assembly 420, allowing the bottom hole assembly 420 to transfer the added weight to the drill bit 426, and in turn, to assist the drill bit 426 in penetrating the surface 304 and subsurface formations 314.

During drilling operations, a mud pump 432 may pump drilling fluid (sometimes known by those of ordinary skill in the art as "drilling mud") from a mud pit 434 through a hose 436 into the drill pipe 418 and down to the drill bit 426. The drilling fluid flows out from the drill bit 426 and be returned to the surface 404 through an annular area 440 between the drill pipe 418 and the sides of the borehole 312. The drilling fluid may then be filtered to remove subsurface formation 314 cuttings and returned to the mud pit 434, where such fluid is filtered. In some embodiments, the drilling fluid may be used to cool the drill bit 426, as well as to provide lubrication for the drill bit 426 during drilling operations. Additionally, the drilling fluid may be used to remove subsurface formation 314 cuttings created by operating the drill bit 426.

In some embodiments, the formation 314 cuttings may be collected during the filtration of the drill mud described above. These formation 314 cuttings may be rinsed to remove the drilling mud, additionally sieved and analyzed at well site or in a laboratory using a variety of methods including but not limited to XRF (X-Ray Fluorescence), SEM/EDX (Scanning electron microscope coupled with an Energy Dispersive X-Ray, thermo determinate Pyrolysis to evaluate the elemental composition, pseudo gamma ray log, mineralogy, Lithologic and fracture structure, macro porosity, density, producible liquid hydrocarbons, hydrocarbon type and quantity, and/or thermal maturity.

In some embodiments, a system 364, 464 may include a display 496 to present geological data as discussed previously. The systems 364, 464 may also include computation logic (e.g., controller, processor), perhaps as part of a surface logging facility 392, or a computer workstation 354, to receive signals from transducers, gamma ray receivers, and other instrumentation to determine properties of the formation 314 and to transform acoustic data that has been acquired. The data may be stored in memory.

The processor/controllers/memory discussed herein may be characterized as "modules". Such modules may include hardware circuitry, and/or a processor and/or memory circuits, software program modules and objects, and/or firmware, and combinations thereof, as appropriate for particular implementations of various embodiments. For example, in some embodiments, such modules may be included in an apparatus and/or system operation for executing the embodiment illustrated in FIG. 2.

Further examples include, but are not limited to:

Example 1 is a method for predicting geomechanical properties of formations surrounding a horizontal well path, the method comprising: collecting vertical situational data from a plurality of depths of a vertical well in a geological formation; collecting horizontal situational data from a plurality of locations along the horizontal well path in the geological formation; collecting geological data associated with the plurality of depths of the vertical well; and generating pseudo-logs for the horizontal well path based on the vertical situational data, the horizontal situational data, and the geological data associated with the plurality of depths.

In Example 2, the subject matter of Example 1 can further include wherein collecting horizontal situational data comprises collecting gamma ray data from a gamma ray receiver deployed in the horizontal well path.

In Example 3, the subject matter of Examples 1-2 can further include wherein collecting horizontal situational data comprises collecting data from resistivity logs of the geological formation.

In Example 4, the subject matter of Examples 1-3 can further include wherein collecting horizontal situational data comprises collecting cuttings during a drilling process within the geological formation.

In Example 5, the subject matter of Examples 1-4 can further include wherein collecting horizontal situational data comprises collecting pulsed neutron logging data or density data.

In Example 6, the subject matter of Examples 1-5 can further include wherein the horizontal situational data represent different locations along a length of the horizontal well.

In Example 7, the subject matter of Examples 1-6 can further include wherein collecting vertical situational data comprises collecting gamma ray data from a gamma ray receiver deployed in the vertical well.

In Example 8, the subject matter of Examples 1-7 can further include wherein collecting vertical situational data comprises collecting data from resistivity logs.

In Example 9, the subject matter of Examples 1-8 can further include wherein collecting vertical situational data comprises collecting cuttings and core generated during a drilling process.

In Example 10, the subject matter of Examples 1-9 can further include wherein generating pseudo-logs for the horizontal well path based on the vertical situational data, the horizontal situational data, and the geological data associated with the plurality of depths comprises mapping the associated geological data to each particular location of the plurality of locations along the horizontal well path using the horizontal situational data that is associated with the vertical situational data.

Example 11 is a method for predicting geomechanical properties of formations surrounding a horizontal well path, the method comprising: generating a geological model corresponding to a geological formation; collecting vertical situational data from each of a plurality of depths of a vertical well passing through the geological formation; collecting horizontal situational data from each of a plurality of locations along a horizontal well path passing through the geological formation; collecting geological data associated with each of the plurality of depths of the vertical well based on the geological model; and generating pseudo-logs for the horizontal well path based on the vertical situational data, the horizontal situational data, and the geological data associated with the plurality of depths.

In Example 12, the subject matter of Example 11 can further include determining a first horizontal situational data point that is associated with a first vertical situational data point; and assigning the geological data associated with the first vertical situational data point to the first horizontal situational data point.

In Example 13, the subject matter of Examples 11-12 can further include geosteering a drill bit during a drilling operation of the horizontal well along the horizontal well path.

In Example 14, the subject matter of Examples 11-13 can further include wherein collecting geological data associated with each of the plurality of depths of the vertical well based on the geological model comprises the collection and analysis of drill cuttings and/or performing a wireline logging operation to collect the geological data.

In Example 15, the subject matter of Examples 11-14 can further include computing production indices from the pseudo logs.

In Example 16, the subject matter of Examples 11-15 can further include ordering facies using clustering of the pseudo logs.

In Example 17, the subject matter of Examples 11-16 can further include estimating, at predetermined intervals along the horizontal well path, simulated reservoir volume in response to the pseudo logs.

In Example 18, the subject matter of Examples 11-17 can further include using the one or more production indices in an algorithm to select non-contiguous stage intervals to be fractured and perforation locations within each stage.

Example 19 is a system comprising: a drill string comprising a gamma ray transceiver; and a controller coupled to the drill string and configured to control geosteering of the drill string along a horizontal well path through a geological formation in response to pseudo-logs generated for the horizontal well path, wherein the pseudo-logs are generated from mapping geological data associated with each particular location of a plurality of locations along the horizontal well path using collected horizontal situational data that is associated with collected vertical situational data.

In Example 20, the subject matter of Example 19 can further include wherein the controller is further configured to use gamma ray data from the gamma ray transceiver to determine the horizontal situational data.

In Example 21, the subject matter of Examples 19-20 can further include wherein the controller is further configured to use a gamma ray transceiver in the offset well to determine the vertical situational data.

In Example 22, the subject matter of Examples 19-21 can further include wherein the controller is further configured to acquire data during a measure while drilling (MWD) or logging while drilling (LWD) operation in geosteering the drill string.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method of predicting geomechanical properties of formations for fracturing operations, the method comprising:
   drilling a portion of a first well along a vertical well path in a geological formation;
   collecting, by a downhole tool coupled to a drill string disposed in the first well, vertical situational data and geological data associated with each of a plurality of depths along the vertical well path of the first well drilled in the geological formation;
   drilling a portion of a second well along a horizontal well path in the geological formation;
   collecting, by a downhole tool coupled to a drill string disposed in the second well, horizontal situational data from each of a plurality of locations along the horizontal well path of the second well drilled in the geological formation;
   mapping the geological data associated with each of the plurality of depths of the vertical well path of the first well to a corresponding location in the plurality of locations along the horizontal well path of the second well, based on the vertical situational data that corresponds to the horizontal situational data collected for each location;
   generating pseudo-logs for the horizontal well path of the second well, based on the vertical situational data, the horizontal situational data, and the mapped geological data for each of the plurality of locations along the horizontal well path;
   estimating geomechanical properties of the formation surrounding the horizontal well path of the second well, based on the generated pseudo-logs; and
   performing one or more stages of a fracturing operation along the horizontal well path of the second well, based on the estimated geomechanical properties of the formation.

2. The method of claim 1, wherein collecting horizontal situational data comprises collecting gamma ray data from a gamma ray receiver deployed in the horizontal well path.

3. The method of claim 1, wherein collecting horizontal situational data comprises collecting data from resistivity logs of the geological formation.

4. The method of claim 1, wherein collecting horizontal situational data comprises collecting cuttings during a drilling process within the geological formation.

5. The method of claim 1, wherein collecting horizontal situational data comprises collecting pulsed neutron logging data or density data.

6. The method of claim 1, wherein the horizontal situational data represent different locations along a length of the horizontal well path.

7. The method of claim 1, wherein collecting vertical situational data comprises collecting gamma ray data from a gamma ray receiver deployed in the first well along the vertical well path.

8. The method of claim 1, wherein collecting vertical situational data comprises collecting data from resistivity logs.

9. The method of claim 1, wherein collecting vertical situational data comprises collecting cuttings and core generated during a drilling process.

10. The method of claim 1, wherein the geological data associated with each of the plurality of depths along the vertical well path is collected using a measure while drilling (MWD) or logging while drilling (LWD) tool coupled to the drill string disposed in the first well.

11. A computer-implemented method of predicting geomechanical properties of formations for fracturing operations, the method comprising:
   generating a geological model corresponding to a geological formation;
   drilling a portion of a first well along a vertical well path in the geological formation;
   collecting, by a downhole tool coupled to a drill string disposed in the first well, vertical situational data from each of a plurality of depths along the vertical well path of the first well passing through the geological formation;
   drilling a portion of a second well along a horizontal well path in the geological formation;
   collecting, by a downhole tool coupled to a drill string disposed in the second well, horizontal situational data from each of a plurality of locations along the horizontal well path of the second well passing through the geological formation;
   collecting geological data associated with each of the plurality of depths of the vertical well path of the first well based on the geological model;
   mapping the geological data associated with each of the plurality of depths of the vertical well path of the first well to a corresponding location in the plurality of locations along the horizontal well path of the second well, based on the vertical situational data that corresponds to the horizontal situational data collected for each location;

generating pseudo-logs for the horizontal well path of the second well, based on the vertical situational data, the horizontal situational data, and the mapped geological data for each of the plurality of locations along the horizontal well path;

estimating geomechanical properties of the formation surrounding the horizontal well path of the second well, based on the generated pseudo-logs; and performing one or more stages of a fracturing operation along the horizontal well path of the second well, based on the estimated geomechanical properties of the formation.

12. The method of claim 11, wherein mapping the collected geological data comprises:

determining a first horizontal situational data point that is associated with a first vertical situational data point; and assigning the geological data associated with the first vertical situational data point to the first horizontal situational data point.

13. The method of claim 11, further comprising geosteering a drill bit during a drilling operation of the second well along the horizontal well path.

14. The method of claim 11, wherein collecting geological data associated with each of the plurality of depths of the vertical well path based on the geological model comprises the collection and analysis of drill cuttings and/or performing a wireline logging operation to collect the geological data.

15. The method of claim 11, further comprising computing production indices from the pseudo logs.

16. The method of claim 11, further comprising ordering facies using clustering of the pseudo logs.

17. The method of claim 11, further comprising estimating, at predetermined intervals along the horizontal well path, simulated reservoir volume in response to the pseudo logs.

18. The method of claim 11, further comprising using the one or more production indices in an algorithm to select non-contiguous stage intervals to be fractured and perforation locations within each stage.

* * * * *